UNITED STATES PATENT OFFICE.

WALTER H. THEW, OF LIVERPOOL, COUNTY OF LANCASTER, ENGLAND.

CONDENSED PEPTONIZED MILK WITH COFFEE.

SPECIFICATION forming part of Letters Patent No. 324,050, dated August 11, 1885.

Application filed December 4, 1884. (No specimens.) Patented in England November 13, 1884, No. 14,965.

*To all whom it may concern:*

Be it known that I, WALTER HENRY THEW, a subject of the Queen of England, residing at Liverpool, in the county of Lancaster, in the Kingdom of England, have invented certain new and useful Improvements in the Preparation of Condensed Peptonized Milk and Coffee, (for which application for Letters Patent has been made in England, No. 14,965, of November 13, 1884,) of which the following is a specification.

This invention consists in adding to milk which has been peptonized, either before or during the process of condensation, a suitable infusion or an extract or essence of coffee—such, for instance, as is commonly sold—and then completing the process, as in making ordinary condensed peptonized milk. I have found that in this preparation the bitter taste of peptonized milk is well concealed, and that a highly-palatable preparation of coffee and peptonized milk can be produced, capable of digestion by persons of weak digestive powers.

In preparing condensed peptonized coffee and milk I proceed as follows: Having raised the temperature of the milk to be peptonized to preferably between 55° and 65° centigrade, I add phosphate of soda (formula $Na_2HPO_4 + 12H_2O$) in the proportion of half an ounce to two ounces for each gallon of the milk employed. I then add a sufficient quantity of active extract of pancreas, preferring an aqueous, alcoholic, or glycerine extract. Numerous varieties of these extracts are made and sold, and the amount of any one required can only be found by testing the particular sample with milk.

The process of peptonizing is allowed to go on for a period usually varying between one or two hours, according to the activity of the extract of pancreas employed, the temperature being maintained at from 55° to 65° centigrade. When the process of peptonizing is complete, the liquid is heated, and after being boiled for some minutes, so as to kill the ferment and any germs of noxious organisms which may have been contained in the milk and other materials used, sugar is added in about the same proportions as are employed in preparing sweetened condensed milk, and then a suitable quantity of infusion or extract of coffee is added and the condensation carried on until the condensed product contains about 20 to 25 per cent. of water, or the coffee infusion may be added during the process of condensation. The compound is then preserved in tins in the ordinary way.

The amount of infusion or extract of coffee is so regulated that the product, when mixed with water, will have the flavor of well-made "café au lait."

I claim as my invention—

1. Condensed peptonized milk with coffee, as a new article of manufacture.

2. Condensed peptonized milk with coffee and phosphate of soda, as a new article of manufacture.

In testimony whereof I have signed my name to this specification in the presence of two subscribing witnesses.

WALTER H. THEW.

Witnesses:
    I. OWDEN O'BRIEN,
    JOSEPH I. ROYDEN.